2,789,882

PREPARATION OF ZIRCONIUM TETRAFLUORIDE

Owen F. Sprague, Akron, N. Y., assignor to the United States of America as represented by the Secretary of the Army No Drawing. Application June 27, 1955,
Serial No. 518,426

5 Claims. (Cl. 23—88)

The invention described herein may be manufactured and used by or for the Government of the United States of America for governmental purposes without the payment to me of any royalty thereon.

This invention relates to a novel method for preparing metallic fluorides, and more particularly to the preparation of zirconium tetrafluoride.

It is an object of this invention to provide a novel method for the economic and efficient production of zirconium tertafluoride.

Other objects will in part appear in and in part be obvious from the following detailed description.

The present invention comprises the preparation of zirconium tetrafluoride by the interreaction of zirconium tetrachloride with hydrofluoric acid in the presence of an inert organic liquid reaction medium. The reaction may be represented by the following equation:

$$4HF + ZrCl_4 \longrightarrow 4HCl + ZrF_4$$

It has been found that it is advantageous, if not essential, that in the reaction vessel the temperature of the reaction be maintained below the normal boiling point of hydrofluoric acid, and preferably at from about 0° C. to about 5° C. by application of a suitable cooling medium. This can be accomplished by jacketing the reaction vessel and circulating a cooling medium around said vessel. The gas outlet means is desirably also cooled, e. g., by Dry Ice. Low temperatures are maintained to inhibit the escape of unreacted hydrofluoric acid.

The inert organic reaction medium should be capable of retaining zirconium tetrachloride in suspension. It is also necessary that the inert organic reaction medium be a liquid at the low temperatures employed in the reaction. Among such inert organic liquid media, ethylene dichloride, has been found to be particularly effective. Other halogenated low boiling hydrocarbon solvents such as methylene chloride, trichlorethylene, etc., could be suitable, however.

It is desirable that the apparatus employed in carrying out the reaction be dry to, among other things, retard the corrosive effects of the acidic substances present. It has been found that sweeping the apparatus with hot helium gas prior to carrying out the reaction is particularly effective in rendering such apparatus suitably dry.

The reaction is continued until the effluent gases do not contain any hydrogen chloride. One means for detecting the presence of hydrogen chloride in the effluent gases is by bringing the effluent gases into contact with a silver nitrate solution. The formation of a white precipitate would indicate the presence of hydrogen chloride.

The following specific example is given to further illustrate and describe the present invention.

Example

A jacketed copper reaction vessel equipped with a mechanical stirrer, gas inlet means, and gas outlet means is swept dry with hot helium gas. Dry ethylene chloride in the amount of 700 cc. is introduced into the reaction vessel. Powdered zirconium tetrachloride in the amount of 100 gm. is then added quickly, and the apparatus is quickly sealed. The bath surrounding the reaction vessel is brought to a temperature of from 0° to 5° C. and maintained at this temperature. The gas outlet means is surrounded with Dry Ice. Anhydrous hydrogen fluoride is passed through the inlet means at the maximum rate possible without its escaping from the gas outlet means. The end of the gas outlet means is inserted into concentrated sulfuric acid. When no more hydrogen chloride is evolved, the flow of hydrogen fluoride is stopped. The reaction vessel is opened and the contents thereof filtered on a suction filter constructed of copper. The filter cake is washed with methanol, then dried at 110° C., to obtain solid zirconium tetrafluoride.

Variations in the technique and processes described above will readily suggest themselves to the person skilled in the art. It is not intended that the invention be limited except as defined in the appended claims.

I claim:

1. The method of preparing zirconium tetrafluoride which comprises reacting zirconium tetrachloride with hydrogen fluoride in an inert low boiling partially chlorinated aliphatic hydrocarbon liquid and at a temperature below the normal boiling point of hydrogen fluoride.

2. The method of preparing zirconium tetrafluoride which comprises reacting zirconium tetrachloride with hydrogen fluoride in ethylene dichloride and at a temperature below the normal boiling point of hydrogen fluoride.

3. The method of preparing zirconium tetrafluoride which comprises reacting zirconium tetrachloride with hydrogen fluoride in ethylene dichloride and at a temperature of about 0° C. to about 5° C.

4. The method of preparing zirconium tetrafluoride which comprises suspending zirconium tetrachloride in ethylene dichloride, and passing hydrogen fluoride through said suspension, while maintaining the temperature at from about 0° C. to about 5° C.

5. The method of preparing zirconium tetrafluoride as defined in claim 1, wherein the reaction is conducted under anhydrous conditions.

References Cited in the file of this patent

UNITED STATES PATENTS 2,602,725    Wilhelm et al. _____ July 8, 1952

OTHER REFERENCES

J. W. Mellor's "A Comprehensive Treatise on Inorganic and Theoretical Chemistry," vol. 7, 1927 ed., page 137, Longmans, Green & Co., N. Y.

Comey-Hahn: "A Dictionary of Chemical Solubilities—Inorganic," 1921 ed., page 1127. The MacMillan Co., N. Y., publishers.